April 11, 1961 F. P. GOHOREL 2,979,642

TELEPHONE SYSTEMS

Filed Dec. 4, 1952

Inventor
FERNAND P. GOHOREL

By
Robert Harding Jr.
Attorney

United States Patent Office 2,979,642
Patented Apr. 11, 1961

2,979,642

TELEPHONE SYSTEMS

Fernand Pierre Gohorel, Antony, France, assignor to International Standard Electric Corporation, New York, N.Y., a corporation of Delaware Filed Dec. 4, 1952, Ser. No. 323,992

Claims priority, application France Jan. 17, 1952

5 Claims. (Cl. 317—139)

The present invention relates to telephone systems wherein devices for simultaneously testing several lines are used. In such a case, several lines can be found that meet the required conditions. Moreover, if relays are used for the testing, there is available a chain of contacts which, because of its very arrangement, provides an order of priority in the choice of lines. In some cases this priority is undesirable, and one of the objects of the invention is to change it cyclically in order to obtain an even distribution of traffic among all the lines capable of being chosen.

One of the features of the invention lies in the cyclic change of the pull-up time of the test relays, each test relay having at a given moment a pull-up time different from those of the other test relays, with the relay that has the shortest pull-up time having the No. 1 priority and the relay with the shortest pull-up time after the first relay having the No. 2 priority and so on.

Another feature of the invention lies in the cyclic change of the pull-up time of the test relays by using a supplementary winding that is sequentially: (*a*) short-circuited; (*b*) terminated by resistances of variable values, and (*c*) opened.

Another feature of the invention consists in dividing a number of lines into groups and subgroups, a first test being effected in order to select one of said groups, with priority being given cyclically to the various groups and with the selection of a subgroup and a line being then made in the same manner.

Various other features will become apparent from the following description, given as a non-limitative example in connection with the appended drawings, in which.

Figure 1:
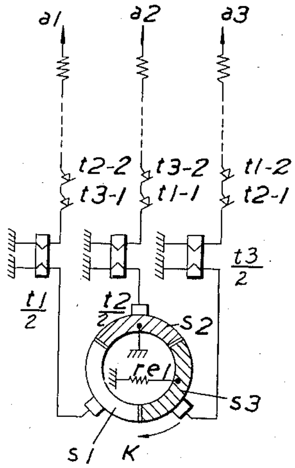
Fig. 1 is a test device for a group of lines in accordance with the spirit of the invention.

The test device shown in Fig. 1 will now be described.

In the descriptions that follow, the relay contacts that are closed when the relay with which they are associated is energized, i.e., has pulled up, are designated by placing the letter T in front of the number of the contact spring, and the contacts that are closed when the relay is not energized, i.e., is unoperated, are designated by placing the letter R in front of the number of the contact spring. Moreover, the contact springs associated with a given relay are designated by placing a numeral from 1 to 9 after the relay reference.

Relays *t*1, *t*2, *t*3 (Fig. 1) are test relays that may be connected to the test wires *a*1, *a*2 and *a*3. If the idle condition of the lines associated with test wires *a*1, *a*2 and *a*3 is determined by the presence of a negative potential supplied by a battery whose other terminal is grounded, relays *t*1, *t*2 and *t*3 will become energized. Each of relays *t*1, *t*2 and *t*3 has two contacts that open the circuits of the other two relays. The first *t* relay to become energized will therefore be the first to open the circuits of the other two, preventing the latter from energizing and from opening, in turn, the circuit of the first relay. Consequently, two lines cannot be selected at the same time.

Relays *t*1, *t*2 and *t*3 are provided with a second winding, one side of which is permanently connected to ground and the other side is connected to a switch K. Switch K, as shown in Fig. 1, takes the form of a rotating drum made up of three segments, *s*1, *s*2 and *s*3, insulated from one another and each extending over an arc of 120°. Three brushes separated by 120° from one another and connected to the supplementary windings of relays *t*1, *t*2 and *t*3, respectively, can be used to make contact with said three segments. One of the segments, *s*1, is isolated; the second segment, *s*2, is connected directly to ground, and the third, *s*3 is connected to ground through a resistance *re*1.

These arrangements make it possible to change the pull-up time of the relays depending on the particular segment to which they are connected. In the case shown in Fig. 1, relay *t*1 becomes energized first, and relay *t*2 energizes last. When switch K has been rotated through 120° in the direction of the arrow, and then 240° from its starting position, the pull-up time of relays *t*1, *t*2 and *t*3 will have been changed following a circular permutation and the priority will have been given in sequence to lines *a*1, *a*2 and *a*3.

In the case where the lines corresponding to wires *a*2 and *a*3 are the only ones idle, line *a*3 will have priority, since its test relay *t*3 will have its supplementary winding connected to ground through resistance *re*1, which gives it a pull-up time shorter than that of relay *t*2.

It should therefore be noted that the continuous rotation of the drum periodically changes the circuit of the supplementary windings, thus creating a shift in the pull-up time of the various relays. These changes are far greater than those resulting from differences in the manufacture of said relays, which differences are therefore obviated.

Figure 2:
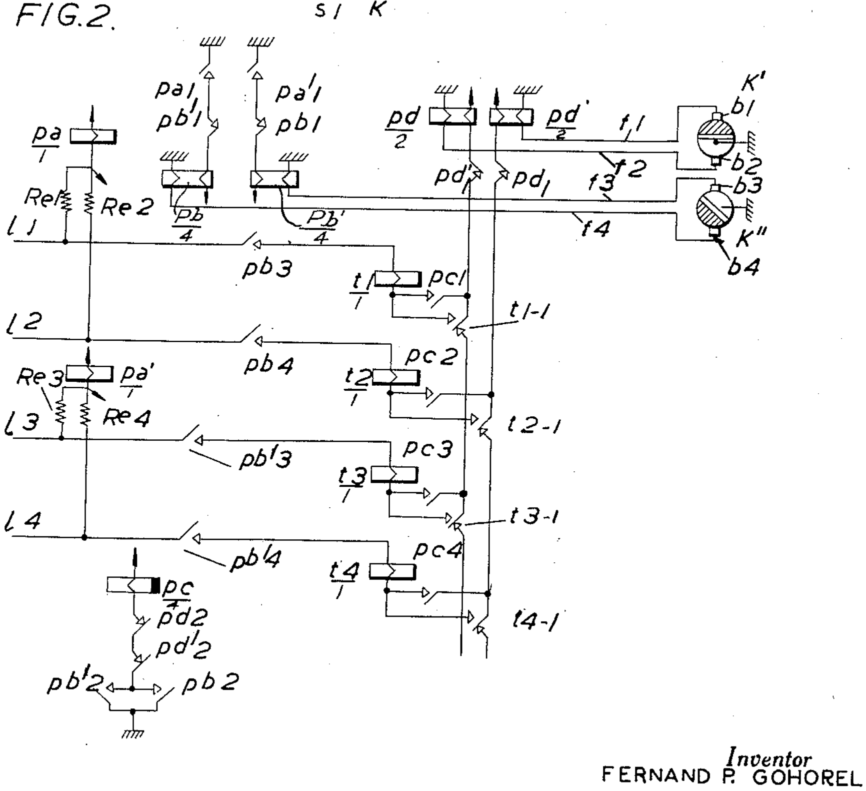
Fig. 2 is a device that makes possible the choice of one line from among a sizeable group of calling lines.

The device shown in Fig. 2 will now be described. This device makes it possible to give priority to a given one of a large number of lines when some or all of these lines are calling at the same time.

The four lines shown correspond to wires *l*1, *l*2, *l*3 and *l*4, respectively, one of these wires being grounded when a call is made.

These lines are divided into two groups. The priority will be of two degrees of types: (1) group priority and (2) line priority within a group. Switches K' and K'' are similar to the switch just described, but consist only of two segments, one of which is isolated and the other is directly connected to ground.

It will be assumed that all the lines are calling at the same time, and therefore wires *l*1 to *l*4 will all be grounded. Relay *pa* associated with the first group, made up of *l*1 and *l*2, is energized through resistances R*e*1 and R*e*2, while relay *pa'* associated with the second group, made up of *l*3 and *l*4, is energized through resistances R*e*3 and R*e*4.

The following circuits are completed by front contacts *pa*1 and *pa'*1, respectively:

(1) ground, T*pa*1, R*pb'*1, right-hand winding of relay *pb* and battery;
(2) ground, T*pa'*1, R*pb*1, left-hand winding of relay *pb'* and battery.

Relays *pb* and *pb'* are provided with a supplementary winding, one side of which is connected to ground and the other side is connected through wires *f*3 and *f*4 to two fixed brushes *b*3 and *b*4 of switch K''. Depending on the segment of switch K'' that is in contact with either *b*3 or *b*4, the supplementary winding of relay *pb* or of relay *pb'* will be short-circuited. It will be assumed that the supplementary winding of *pb'* is short-circuited. The result, as has already been pointed out, will be that relay *pb* will become energized before relay *pb'*. Relay *pb* becomes energized.

Through its back contact *pb*1, it opens the energizing circuit of relay *pb'*, which cannot, therefore, energize. Through its front contact T*pb*2, it completes the energizing circuit of relay *pc:* R*pd*2, R*pd'*2, T*pb*2 and ground. Through its front contacts *pb*3 and *pb*4, relay *pb* prepares the possible energizing circuits of relays *t*1 and *t*2 in series with relays *pd* and *pd'*, respectively.

The energization of relay *pb* has thus given priority to the group of lines made up of *l*1 and *l*2.

Relay *pc* operates. Through its front contacts *pc*1 and *pc*2 it prepares the following circuits:

(1) ground on *l*1, T*pb*3, relay *t*1, T*pc*1, R*pd'*1 right-hand winding of relay *pd* and battery;

(2) ground on *l*2, T*pb*4, relay *t*2, T*pc*2, R*pd*1, left-hand winding of relay *pd'* and battery.

Relays *pd* and *pd'* are provided with a supplementary winding, one side of which is connected to ground and the other side is connected through wires *f*1 and *f*2 to the two fixed brushes *b*1 and *b*2 of switch K'. In Fig. 2, brush *b*1 is in contact with the isolated segment of K'. The supplementary winding of relay *pd* is therefore short-circuited. This relay is therefore slowed down and it is relay *pd'* that becomes energized in series with relay *t*2.

Through its contact *t*2–1, relay *t*2 next completes for itself a holding circuit.

Through its contact *pd'*1, relay *pd'* opens the energizing circuit of relays *t*1 and *pd*. Through its contact *pd'*2, it opens the energizing circuit of relay *pc*. The release of relay *pc* is delayed for a given time and its contact *pc*2 is not opened until after front contact *t*2–1 has closed, so as not to create a discontinuity in the energizing circuit of relays *t*2 and *pd'*.

The priority within the group has thus been given to line *l*2, whose call will be put through first.

It should be noted that it is not always necessary to have a complete priority for each of the lines in a group of lines. It is conceivable that the lines making up a group may be divided into various subgroups having alternate priorities, with no priority being provided within this group, thus saving a certain number of relays.

Likewise, rotating switches can be used having a larger number of segments, each segment being connected to ground through resistances of different values.

It goes without saying that the rotating switch used to change cyclically the pull-up time of the relays may be replaced with relays or contactors or with any other suitable device.

What I claim and desire to secure by Letters Patent is:

1. A circuit arrangement comprising a plurality of relays, separate independent circuits for operating said relays, means controlled by the operation of each of said relays for breaking the circuits of the other relays, and means for altering the relative speeds of the pull-up time of said relays in a predetermined cyclic manner.

2. A circuit arrangement, according to claim 1, in which the means for altering the relative speeds of the pull-up time of the relays comprises a separate circuit for each relay effectively coupled to the operating winding thereof, and means for opening said circuits successively.

3. A circuit arrangement, according to claim 2, in which each of the separate relay circuits includes a separate winding of the associated relay and connects the ends of said winding together.

4. A circuit arrangement, according to claim 3, in which the means for altering the relative speeds of the pull-up time of the relays comprises a rotatable commutator having a plurality of segments and a plurality of cooperating brushes, the number of segments and brushes being equal to the number of relay circuits and each relay circuit being connected to one of said brushes and therefore including said commutator, the effective resistance of each of said segments being different from that of the others.

5. A circuit arrangement comprising a plurality of circuits arranged in groups, a plurality of first relays, there being one first relay for each group connected to the circuits of said group, so as to be operated when any circuit of said group is closed, a plurality of second relays, there being one for each group of circuits, each of said second relays being controlled by the contacts of a respective one of said first relays, means controlled by the operation of any second relay for opening the operating circuits of all other second relays, means for cyclically and successively altering the time of operation of said second relays, a plurality of third relays equal in number to the number of circuits in a group, a plurality of fourth relays, there being one for each of said plurality of circuits, means controlled by the operation of any second relay for connecting the operating windings of all of the fourth relays in the group associated with said operated second relay in series with the operating windings of the corresponding third relays, means for cyclically and successively altering the time of operation of said third relays, and means controlled by the operation of any third relay for preventing the operation of all other third relays.

References Cited in the file of this patent

UNITED STATES PATENTS

| | | |
|---|---|---|
| 1,669,298 | Hartman | May 8, 1928 |
| 1,838,961 | Robinson | Dec. 29, 1931 |
| 2,347,481 | Hooven | Apr. 25, 1944 |
| 2,382,140 | Culbertson | Aug. 14, 1945 |
| 2,439,405 | Zierdt | Apr. 13, 1948 |

FOREIGN PATENTS

| | | |
|---|---|---|
| 612,774 | Great Britain | Nov. 17, 1948 |